United States Patent [19]

Higashihara et al.

[11] Patent Number: 4,908,645
[45] Date of Patent: Mar. 13, 1990

[54] AUTOMATIC FOCUS ADJUSTING DEVICE

[75] Inventors: Masaki Higashihara; Yasuo Suda, both of Yokohama; Ichiro Ohnuki, Kawasaki; Akira Akashi; Terutake Kadohara, both of Yokohama, all of Japan

[73] Assignee: Canon Kabushiki Kaisha, Tokyo, Japan

[21] Appl. No.: 305,162

[22] Filed: Feb. 2, 1989

[30] Foreign Application Priority Data

Feb. 5, 1988 [JP] Japan .............................. 63-025490
May 25, 1988 [JP] Japan .............................. 63-127571
May 25, 1988 [JP] Japan .............................. 63-127572

[51] Int. Cl.$^4$ .............................................. G03B 3/00
[52] U.S. Cl. .................................. 354/402; 250/201.2
[58] Field of Search ............... 354/402; 250/201 PF, 250/204, 201

[56] References Cited

U.S. PATENT DOCUMENTS

| 4,600,832 | 7/1986 | Grund | 354/402 X |
| 4,681,419 | 7/1989 | Sakai et al. | 354/402 |
| 4,762,986 | 8/1988 | Suda et al. | 354/402 X |
| 4,783,677 | 11/1988 | Hamada et al. | 354/402 |
| 4,816,856 | 3/1989 | Hamada et al. | 354/402 |
| 4,841,325 | 6/1989 | Hoshino et al. | 354/402 |

Primary Examiner—W. B. Perkey
Attorney, Agent, or Firm—Fitzpatrick, Cella, Harper et al.

[57] ABSTRACT

An automatic focusing device for foreseeing or predicting the position of object after a predetermined time, based on plural past focusing operations on the object, utilizing a function of a higher order, and driving a lens for focusing to the predicted object position. According to the present invention there is provided a correcting circuit for correcting the coefficients of the higher-order function to reduce the influence of the measuring errors contained in the past focusing results, thus constantly enabling appropriate focusing.

18 Claims, 18 Drawing Sheets

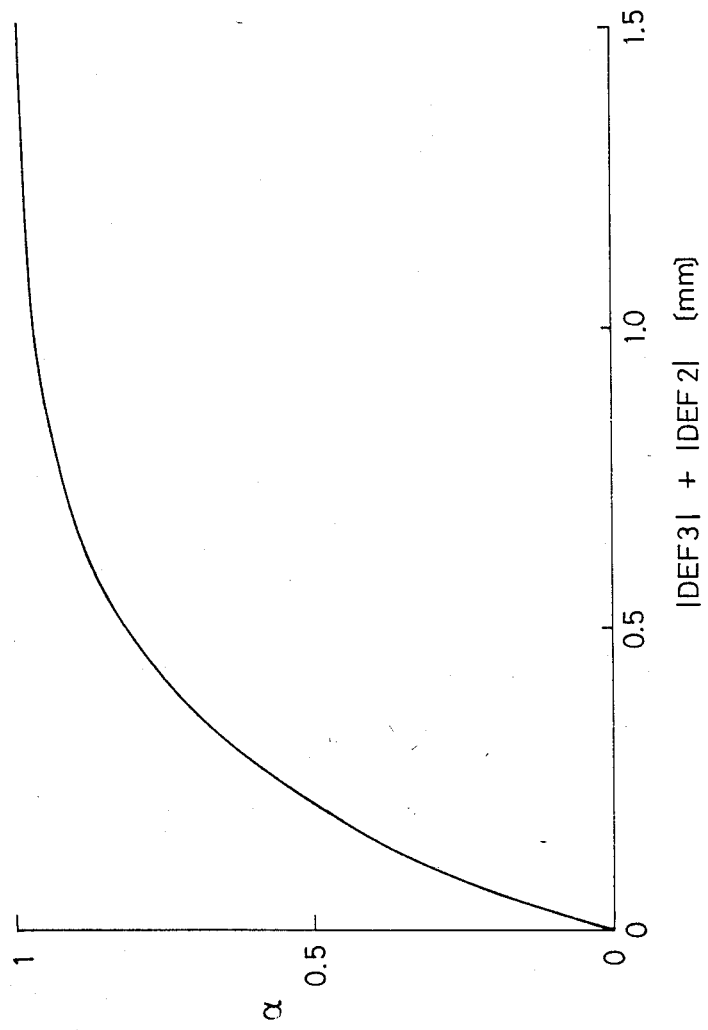

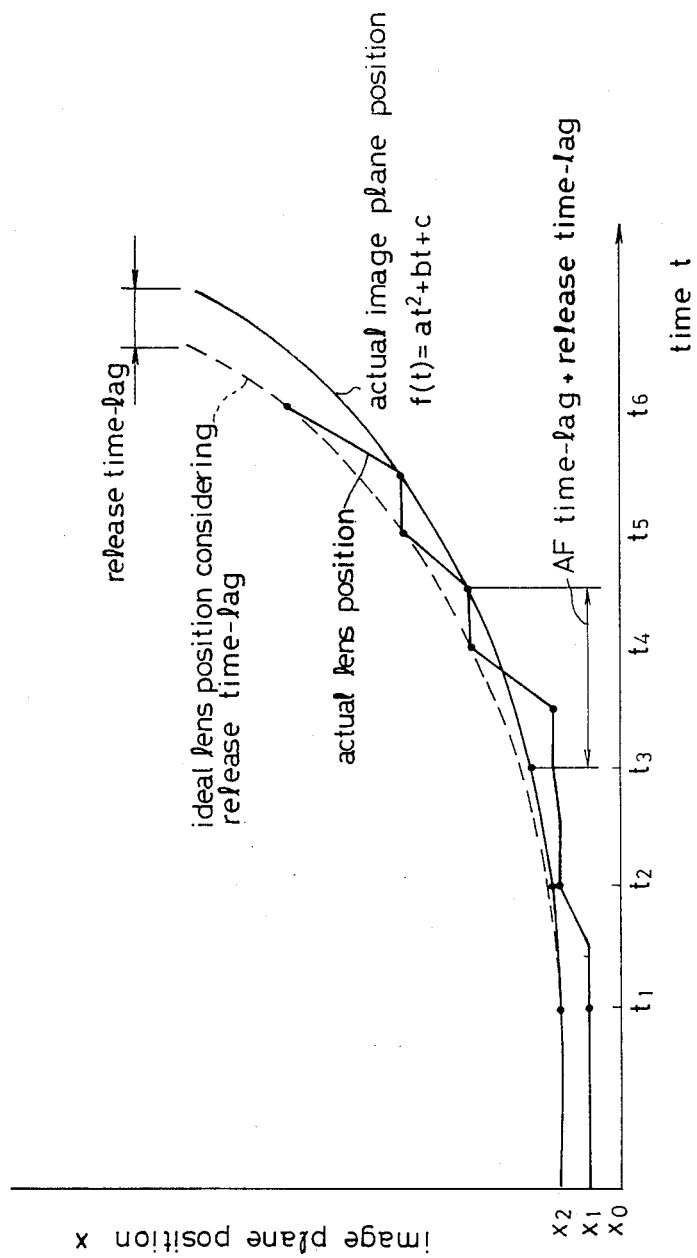

AUTOMATIC FOCUS ADJUSTING DEVICE

BACKGROUND OF THE INVENTION

1. Field of the Invention

The present invention relates to an automatic focusing device for use in a camera or the like.

2. Related Background Art

Most of the automatic focusing systems employed in single-lens reflex cameras achieve focusing by the repetition of a cycle of "focus detection (entry of sensor signal and focus calculation), and lens driving". The amount of lens movement in each cycle is based on the amount of defocus obtained in the focus state detecting operation in said cycle, and the lens movement is conducted in anticipation for eliminating the defocus found at the focus state detection, at the end of the lens movement.

The focus state detection and the lens movement naturally require a certain time. However, as the amount of defocus remains constant for a stationary object unless the lens is moved, the amount of defocus eliminated at the end of lens movement is equal to the amount of defocus detecting at the focus state detection, so that correct focusing can be achieved.

However, in case of an object with a large amount of movement, the amount of defocus may vary in the course of focus state detection and lens movement. Consequently the amount of defocus to be eliminated may be considerably different from the detected amount of defocus, so that the lens may not be focused on the object at the end of lens movement.

In Japanese Patent Application 62-263728 the assignee of the application proposed an automatic focusing method for resolving the above-mentioned drawback.

Said proposed method consists of approximately representing the relation between the position of an image plane resulting from the movement of the object and time with a first-order function and a second-order function in consideration of the amount of detected defocus and the amount of lens movement in each cycle and the intervals of said cycles, thereby correcting the amount of lens movement, and is expected to alleviate said drawback.

However such a focusing method based on prediction may result in an erroneous lens movement if errors are involved in the focus state detecting operation and in the lens driving operation.

Such erroneous lens movement resulting in such errors will be explained in the following.

FIG. 2 is a chart showing the above-mentioned method for correcting the lens movement, in which the position x of the image plane of the object in the ordinate varies as a function of time t in the abscissa.

The solid curve x(t) indicates the position of image plane, at a time t, of the object axially approaching to the camera, when the photographing lens is focused at an infinite distance. The broken-lined curve l(t) indicates the position of the photographing lens at a time t, and proper focusing is achieved when x(t) conicides with l(t). A period $[t_i, t_i']$ indicates the duration of focus state detection, while $[t_i', t_{i+1}]$ indicates the duration of lens movement. Also in the illustrated example it is assumed that the position of the image plane moves according to a second-order function $(at^2+bt+c)$. Therefore, if three image plane positions $(t_1, x_1)$, $(t_2, x_2)$ and $(t_3, x_3)$ at present and in the past can be known at a time $t_3$, it is possible to predict the image plane position $x_4$ at a time $t_4$ which is later than $t_3$ by an "AF time lag" and a "release time lag". The AF time lag is the time required for focus state detection and lens movement, while the release time lag indicates the time from the output of the shutter releasing instruction to the start of the exposure operation.

However, what is in fact detected by the camera is not the image plane positions $x_1$, $x_2$, $x_3$ but the amounts of defocus $DF_1$, $DF_2$, $DF_3$ and the amount of lens movement $DL_1$, $DL_2$ calculated from the amounts of image plane movement. Also the time $t_4$ is a future value which is variable according to the change in accumulating time of an accumulating sensor depending on the luminocity of the object, but is assumed as follows for the purpose of simplicity:

$$t_4 - t_3 = TL = TM2 + \text{(release time lag)} \tag{1}$$

Based on this assumption, the amount of lens movement $DL_3$ can be calculated from the result of focus state detection at $t_3$ as follows:

$$x(t) = at^2 + bt + c \tag{2}$$

By taking $(t_1, l_1)$ as the original point, there can be obtained:

$$t_1 = 0, x_1 = DF_1 \tag{3}$$

$$t_2 = TM1 \quad x_2 = DF_2 + DL_1 \tag{4}$$

$$t_3 = TM1 + TM2 \quad x_3 = DF_3 + DL_1 + DL_2 \tag{5}$$

Then a, b and c can be calculated as follows by substituting (3), (4), and (5) in (2):

$$a = \frac{DF_3 + DL_2 - DF_2}{(TM1 + TM2) \cdot TM2} + \frac{DF_1 - DL_1 - DF_2}{(TM1 + TM2) \cdot TM1} \tag{6}$$

$$b = \frac{DF_2 + DL_1 - DF_1 - a \cdot TM1^2}{TM1} \tag{7}$$

$$c = DF_1 \tag{8}$$

Consequently the amount of lens movement $DL_3$ corresponding to the amount of image plane movement at the time $t_4$ can be determined as:

$$\begin{aligned} DL_3 &= x_4 - l_3 \\ &= x_4 - x_3 + DF_3 \\ &= a[(TM1 + TM2 + TL)^2 - (TM1 + TM2)^2] + \\ &\quad b \cdot TL + DF_3 \end{aligned} \tag{9}$$

In the following there will be explained the error in prediction resulting from the errors in the focus state detection and lens movement.

FIG. 3 shows the relationship between the position of the image plane and time, wherein a solid line indicates the actually moving position of the image plane. This can be approximated by a second-order function:

$$x = at^2 + bt + c \tag{10}$$

On the other hand, the image plane position recognized by the camera, calculated from the detected amount of defocus and the amount of lens movement, involves an error because said amount of defocus and said amount of lens movement both contain certain errors. More specifically the amounts $x_1'$, $x_2'$ and $x_3'$ can be determined in the following manner:

$$x_1' = DF_1' = DF_1 + \delta f_1 \tag{11}$$

$$x_2' = DF_2' + DL_1' = DF_2 + DL_1 + \delta f_2 + \delta l_1 \tag{12}$$

$$x_3' = DF_3' + DL_1'DL_2' = DF_3 + DL_1 + DL_2 + \delta f_3 + \delta l_1 + \delta l_2 \tag{13}$$

wherein $DF_1'$, $DF_2'$, $DF_3'$ are detected amounts of defocus; $DL_1'$, $DL_2'$ are amounts of lens movement detected by the camera; $DF_1$, $DF_2$, $DF_3$ are true amounts of defocus; $DL_1$, $DL_2$ *l are amounts of actually conducted lens movement*; $\delta f_1$, $\delta f_2$, $\delta f_3$ are errors in the focus state detection; and $\delta l_1$, $\delta l_2$ are errors in the lens movement.

Consequently the differences $\delta_1$, $\delta_2$, $\delta_3$ between the image plane positions recognized by the camera and the actual image plane positions are determined as follows:

$$\delta_1 = x_1' - x_1 = \delta f_1 \tag{14}$$

$$\delta_2 = x_2' - x_2 = \delta f_2 + \delta l_1 \tag{15}$$

$$\delta_3 = x_3 - x_3 = \delta f_3 + \delta l_1 + \delta l_2 \tag{16}$$

Also the second-order function passing through $(t_1, x_1')$, $(t_2, x_2')$ and $(t_3, x_3')$ is represented by:

$$x = a't^2 + b't + c' \tag{17}$$

so that there will result an error $\delta p$ in prediction between the lens position $x_4'$ determined from the above-mentioned function and the image plane position $x_4$ at $t_4$.

Said prediction error $\delta p$ is often several times as large as the error in the focus state detection or the error in the lens movement.

As explained in the foregoing, the error in the focus state detection or in the lens movement, which is negligible in the conventional auto focusing device will be amplified several times and will become intolerable in the predicting-type automatic focusing device in which following correction is conducted.

SUMMARY OF THE INVENTION

In consideration of the foregoing, an aspect of the present invention is to correct a higher-order term in the plural-order function employed in said foreseeing calculation, thereby reducing the influence of the error in the focus state detecting system or in the lens driving system.

Another aspect of the present invention is to provide, under the above-mentioned aspect, an automatic focusing device in which the coefficient of said higher-order term is corrected as a function of the amount of defocus or the amount of lens movement.

Still other aspects of the present invention will become fully apparent from the following description of the embodiments to be taken in conjunction with the attached drawings.

BRIEF DESCRIPTION OF THE DRAWINGS

FIG. 16 is a chart showing the relation between a coefficient $\alpha$ and the defocus amount;

FIGS. 17(a) and 17(b) are charts showing the effect of the embodiment shown in FIG. 11.

DESCRIPTION OF THE PREFERRED EMBODIMENTS

Figure 4:
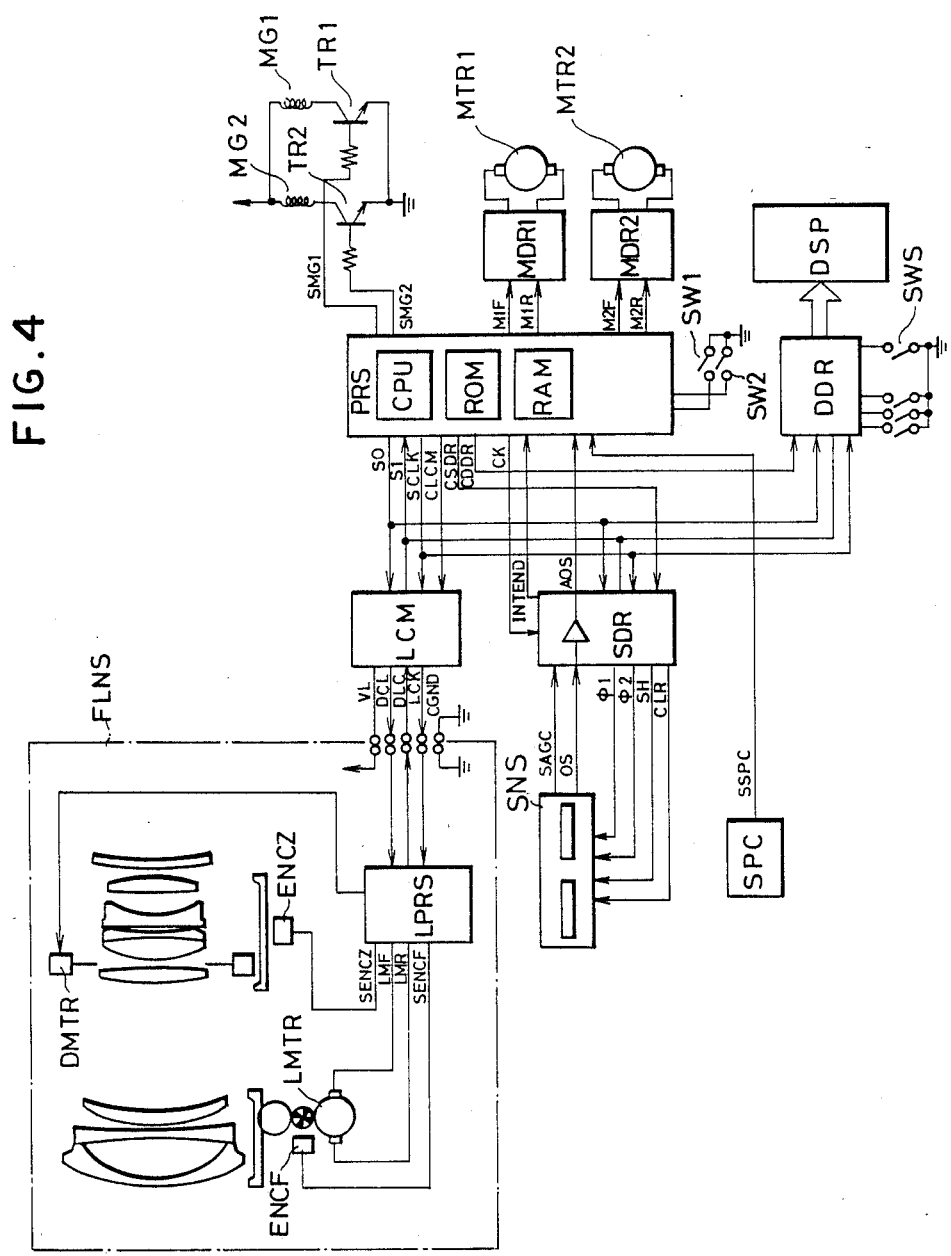
FIG. 4 is a circuit diagram of an embodiment of a camera equipped with the automatic focusing device of the present invention.

FIG. 4 is a circuit diagram of an embodiment of the camera equipped with the automatic focusing device of the present invention.

A camera processor PRS, composed for example of a one-chip microcomputer equipped with a central processing unit (CPU), a ROM, a RAM, an A/D converter etc. controls various functions of the camera, such as automatic exposure control, automatic focus state detection, film advancement etc. according to sequence programs stored in the ROM. For this purpose the microcomputer PRS communicates with the circuits in the camera body and the lens and controls the functions thereof, by means of synchronized communication signals SO, S1, SCLK etc. and communication selection signals CLCLM, CSDR, CDDR etc.

More specifically, SO is data signal released from the microcomputer PRS, S1 is data signal entered into the microcomputer PRS, and SCLK is a synchronization clock signal for the signals SO, S1.

A lens communication buffer circuit LCM supplies electric power to the power terminals of the lens when the camera is in function, and serves as a communication buffer between the camera body and the lens when a selection signal CLCM from the microcomputer PRS is at the high ("H") level state.

When the microcomputer PRS shifts the signal CLCM to the H-level state and sends certain data SO in synchronization with the signal SCLK, the buffer circuit LCM sends buffer signals LCK, DCL for the signals SCLK, SO to the lens through the contacts between the camera body and the lens. Simultaneously it sends a buffered signal S1 of a signal DLC from the lens, and the microcomputer PRS receives the lens data S1 in synchronization with the signal SCLK.

A driving circuit SDR for a focus state detecting sensor SNS composed for example of a CCD, is selected when a signal CSDR is at the H-level state and is controlled by the microcontroller PRS with the signals SO, SI, SCLK.

The signal CK is a clock signal for generating CCD driving clock signals $\phi 1$, $\phi 2$. A signal INTEND is used for informing the microcomputer PRS of the completion of accumulation. the microcomputer PRS.

The output signal OS of the sensor SNS is a time-sequential image signal synchronized with the clock signals $\phi 1$, $\phi 2$, and, after amplification by an amplifier in the driving circuit SDR, is supplied as a signal AOS to the microcomputer PRS. The microcomputer PRS receives said signal AOS through an analog input terminal, effects A/D conversion internally in synchronization with the signal CK, and stores said signal in succession in predetermined addresses in the RAM.

An output signal SAGC from an AGC (auto gain control) sensor in the sensor SNS is supplied to the driving circuit SDR for accumulation control of the sensor SNS.

A light metering sensor SPC for exposure control receives light from the object through the photographing lens, releases an output signal SSPC, which is supplied to the analog input port of the microcomputer PRS, and is utilized, after A/D conversion, for automatic exposure control (AE) according to a predetermined program.

A circuit DDR for switch status detection and display is selected when a signal CDDR is at the H-level state, and is controlled by the microcomputer PRS through the signals SO, SI, SCLK. It changes the display on a display device DSP of the camera according to the data sent from the microcomputer PRS, and informs the on-off state of switches SWS linked with operating members of the camera to the microcomputer PRS.

Switches SW1, SW2 are linked with an unrepresented shutter release button. The switch SW1 is closed by the depression of said button to a first level, and the switch SW2 is closed by the subsequent depression of said button to a second level. As will be explained later, the microcomputer PRS executes light metering and automatic focusing in response to the closing of the switch SW1, and exposure control and film advancement when triggered by the closing of the switch SW2. The switch SW2 is connected to an interruption port of the microcomputer PRS to immediately initiate an interruption program in response to the closing of the switch SW2 even during the execution of a program started by the closing of switch SW1.

A motor MTR1 for film advancement and another motor MTR2 for mirror up-down and shutter spring charging are respectively controlled by driving circuits MDR1, MDR2. Motor control signals M1F, M1R, M2F, M2R are supplied from the microcomputer PRS to the driving circuits MDR1, MDR2.

Solenoids MG1, MG2 for starting the leading and trailing curtains of the shutter are energized by signals SMG1, SMG2 and amplifying transistors TR1, TR2, so that the shutter is controlled by the microcomputer PRS.

Said circuit DDR for switch state detection and display, motor driving circuits MDR1, MDR2 and the shutter control will not be explained in detail as they are not directly related with the present invention.

An in-lens control circuit LPRS receives, in synchronization with the clock signal LCK, a signal DCL representing command data from the camera to the lens FLNS, and lens functions are determined in advance corresponding to said command data.

Said control circuit LPRS analyzes said command according to a predetermined procedure, and executes various operations such as focusing or diaphragm control or releases lens parameters (full-open F-number, focal length, coefficient of amount of defocus to amount of lens movement etc.) as an output signal DLC.

In the present embodiment there is employed a zoom lens. Thus, when a focusing command is sent from the camera, a focusing motor LMTR is activated by signals LMF, LMR according to the amount and direction of drive simultaneously instructed, to axially move the optical system, thereby achieving the focusing operation. The amount of movement of the optical system is monitored by counting pulse signals SENCF of an encoder circuit ENCF with a counter in the control circuit LPRS, and, when a predetermined movement is completed, the control circuit LPRS shifts the signals LMF, LMR to the L-level state, thereby stopping the motor LMTR.

Thus, once a focusing command is sent from the camera, the microcomputer PRS of the camera need not be involved in the lens driving until the lens movement is completed.

Also when a diaphragm control command is sent from the camera, a stepping motor DMTR for diaphragm control is activated according to the number of stop steps sent simultaneously.

The control circuit LPRS detects the zoom position by receiving a signal SENCZ from an encoder circuit ENCZ associated with the zoom optical system. The control circuit LPRS stores lens parameters at different zoom positions, and sends parameters corresponding to the current zoom position, when requested by the microcomputer PRS of the camera.

In the following there will be explained the function of the camera explained above, with reference to a flow chart shown in FIG. 5.

When an unrepresented power switch is turned on, the power supply is provided to the microcomputer PRS, which thus starts the execution of a sequence program stored in the ROM.

Figure 5:
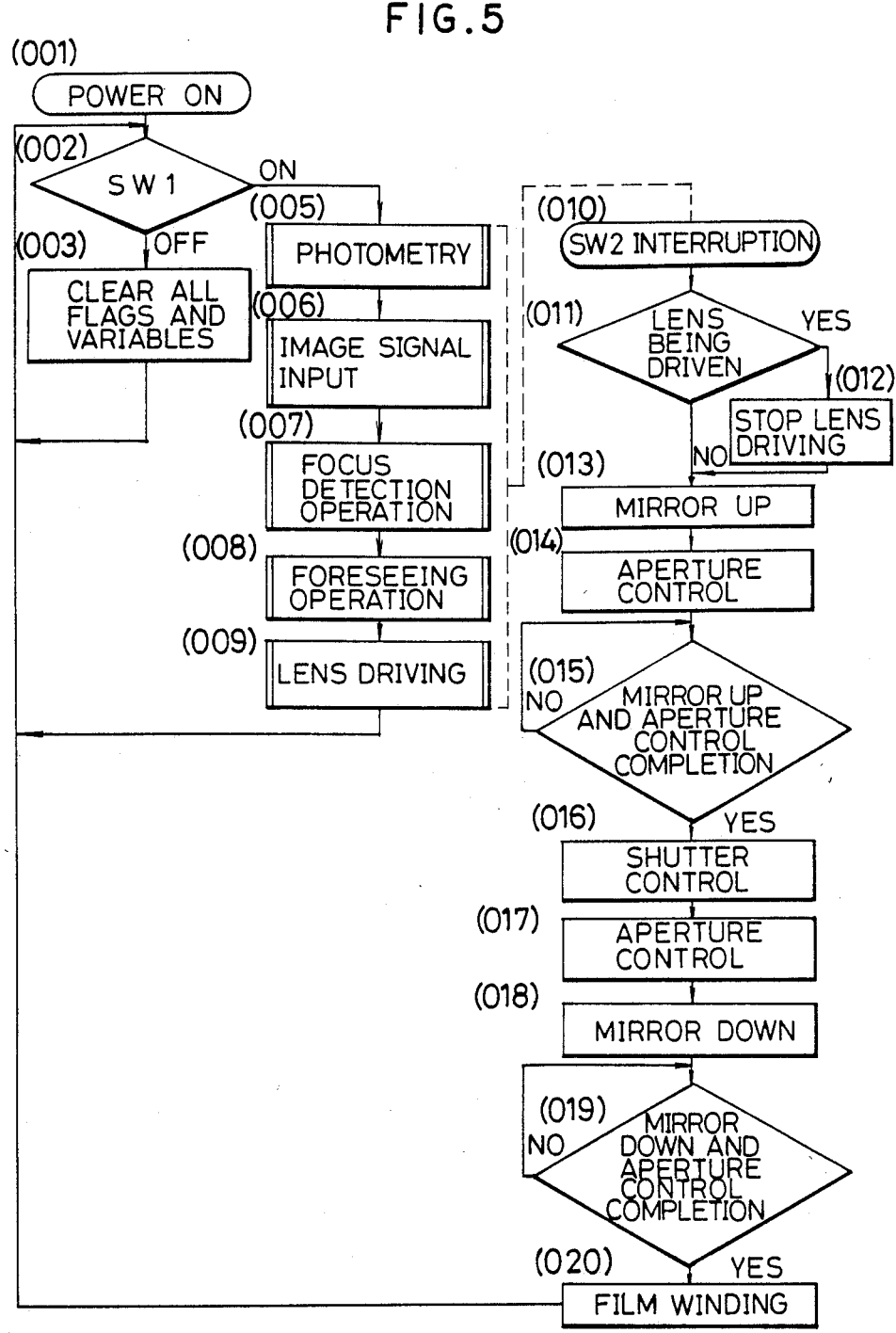
FIG. 5 is a flow chart showing the function of the automatic focusing device shown in FIG. 4.

FIG. 5 is a flow chart showing the control sequence of said program. When the program execution is started in a step (001), a step (002) discriminates the state of the switch SW1 to be closed by the depression of the shutter release button to the first level, and, if said switch SW1 is off, a step (003) executes initialization by clearing all the control flags and variables set in the RAM of the microcomputer PRS.

Said steps (002), (003) are repeated until the switch SW1 is closed or the power switch is turned off. When the switch SW1 is closed, the sequence proceeds from the step (002) to a step (005).

The step (005) executes a photometry subroutine for exposure control. The microcomputer PRS receives the output signal SSPC of the light metering sensor SPC shown in FIG. 4 through the analog input port, then executes A/D conversion, calculates optimum values of shutter control and diaphragm control from the obtained digital value, and stores said values in the predetermined addresses of the RAM. The shutter and diaphragm are controlled by these values at the shutter release operation.

Figure 6:
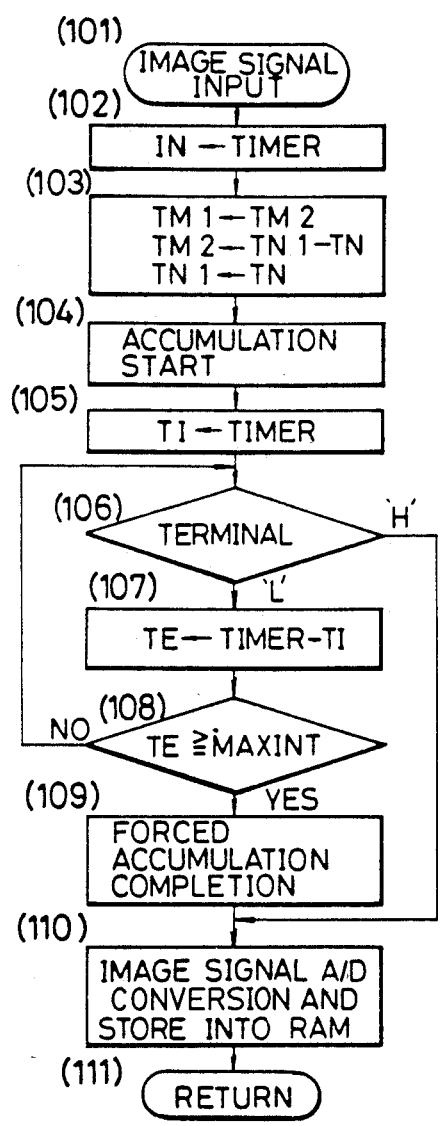
FIGS. 6 and 7 are flow charts of subroutines in the flow chart shown in FIG. 5.

Then a step (006) executes an image signal input subroutine, shown in FIG. 6, for entering the image signal from the focus state detecting sensor SNS, as will be explained in detail later.

Then a step (007) calculates the amount of defocus DEF of the photographing lens according to the entered image signal. The detailed method of calculation is not explained as it is already disclosed for example in the Japanese Patent Application 61-160824 of the assignee of the present application.

Figure 1:
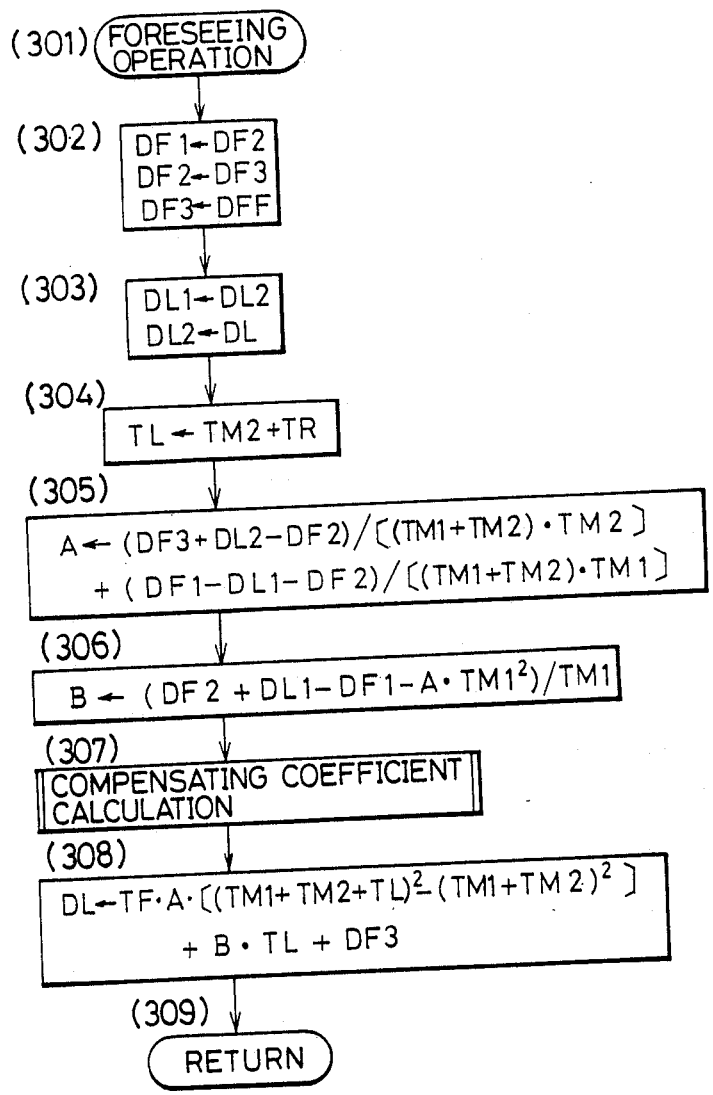
FIG. 1 is a flow chart showing a foreseeing calculation subroutine in the automatic focusing device of the present invention.
Figure 2:
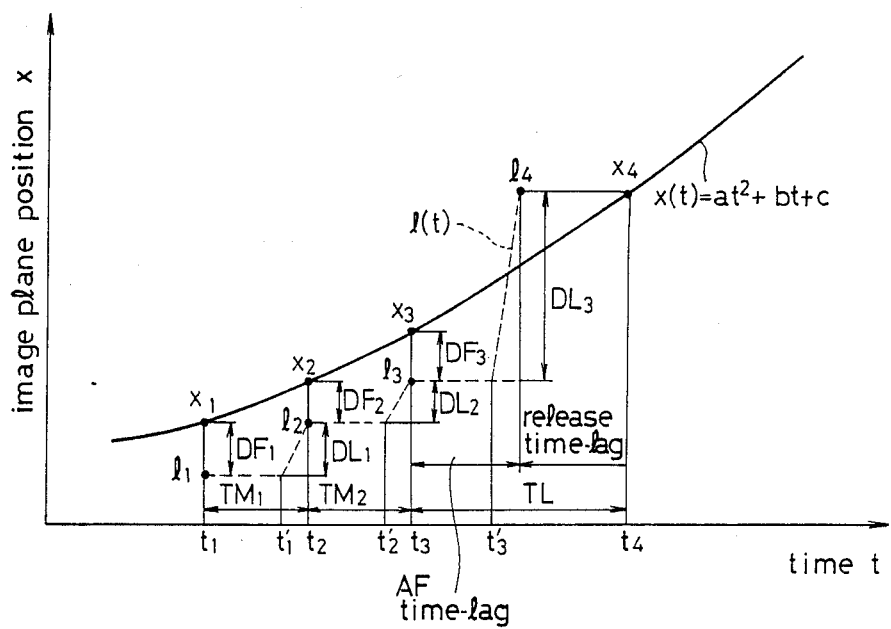
FIG. 2 is a chart showing the principle of lens driving in the automatic focusing device utilizing foreseeing calculation.
Figure 3:
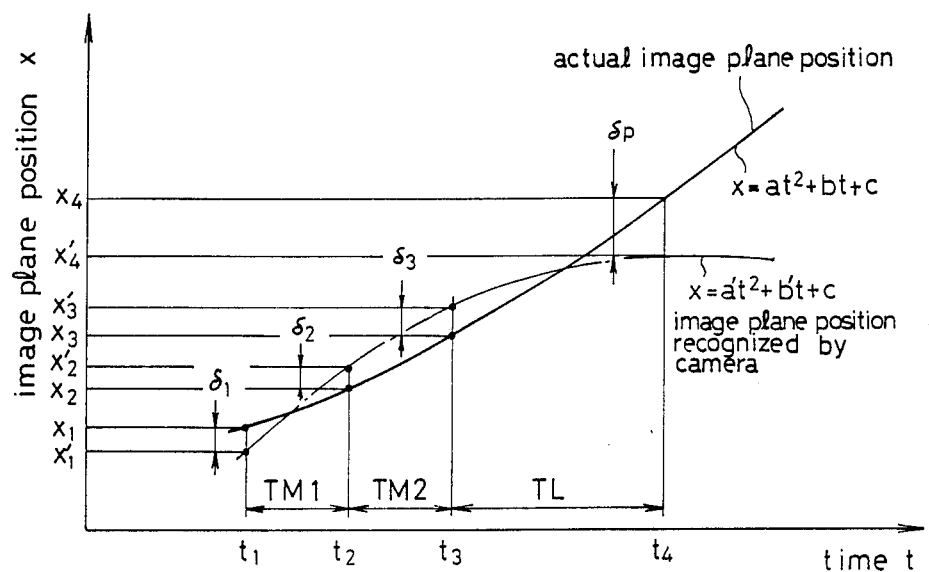
FIG. 3 is a chart showing the errors to be removed by the present invention.

A step (008) executes a prediction calculation subroutine for compensating the amount of lens drive, the flow of which is shown in FIG. 1.

Figure 7:
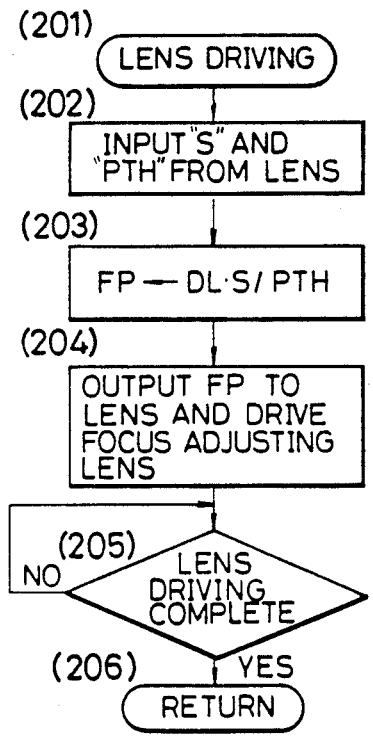

Then a step (009) executes a lens driving subroutine for driving the lens according to the lens drive amount DL corrected in the step (008). The flow of said lens driving subroutine is shown in FIG. 7. After the lens driving, the sequence returns to the step (002) and the steps (005)–(009) are repeatedly executed until the switch SW1 is turned off or the unrepresented switch SW2 is turned on, thereby achieving proper focusing even for a moving object.

Then, when the shutter release button is further depressed to close the switch SW2, the sequence jumps immediately from any step to a step (010) thereby initiating the shutter releasing operation.

A step (011) discriminates whether the lens driving is in progress, and, if so, a step (012) sends a stop command to the lens thereby stopping the lens, and the sequence proceeds to a step (013). If the lens driving is not in progress, the sequence immediately proceeds to the step (013).

The step (013) lifts the quick-return mirror of the camera, by activating the motor MTR2 with the motor control signals M2F, M2R shown in FIG. 4. A next step (014) sends the diaphragm control value, obtained in the photometry subroutine in the step (005), to the lens, thereby causing the lens to effect the diaphragm control.

A step (015) discriminates whether the mirror lifting and diaphragm control in the steps (013), (014) have been completed. The mirror lifting can be confirmed by an unrepresented detecting switch associated with the mirror, while the diaphragm control is confirmed by a communication indicating whether the diaphragm has been reduced to a predetermined stop value. If either is incomplete, the sequence remains in this step to continue the discrimination. The sequence proceeds to a step (016) when the completion of these two operations is confirmed.

The step (016) executes shutter control with the shutter control value, already obtained in the photometry subroutine of the step (005), thereby executing the exposure of the film.

Upon completion of the shutter control, a step (107) sends a command to the lens to shift the diaphragm to a fully-open state, and a step (018) causes the mirror to descend, by controlling the motor MTR2 with the motor control signals M2F, M2R.

A next step (019) awaits the completion of the mirror descent and the opening of the diaphragm, and, upon their completion, the sequence proceeds to a step (020).

The step (020) activates the motor MTR1 with the motor control signals M1F, M1R shown in FIG. 4, thereby advancing the film by a frame.

The foregoing is the control sequence of a camera with prediction automatic focusing.

In the following there will be explained the image input signal subroutine shown in FIG. 6.

The "image signal input" is executed at the start of a new focus state detecting operation. When this subroutine is called in a step (101), a step (102) memorizes the start time of the focus state detecting operation by storing the value TIMER of a self-running timer of the microcomputer PRS in a memory area TN of the RAM.

A step (103) renews values TM1, TM2 corresponding to the intervals TM1, TM2 in the compensating equations (6), (7), (9) explained before. Before the execution of the step (103), there are memorized the intervals TM1, TM2 in the preceding focus state detecting operation, and TN1 indicates the start time of the preceding focus state detecting operation.

Thus TM2 indicates the interval of the focus state detecting operations the one before last and the last one, while TN1-TN indicates said interval between the last one and the present one. These values are stored in the memory areas TM1, TM2 of the RAM, corresponding to TM1, TM2 in the equations (6), (7) and (9). Also TN1 stores the present time, for use in the next focus state detecting operation. In this manner the step (103) always stores, in the memory areas TM1, TM2, the intervals of the focus state detecting operations, between the one before last and the last one, and between the last one and the present one.

A next step (104) causes the sensor SNS to initiate the accumulation of the light image. More specifically the microcomputer PRS shifts the signal CSDR to the H-level state and sends an accumulation start command as the signal SO to the sensor driving circuit SDR, which, in response, shifts the clear signal CLR for the photoelectric converting device in the sensor SNS to the L-level state, thereby initiating the accumulation of the charge.

A step (105) memorizes the present time, by storing the value of a self-running timer as a variable TI.

Then a step (106) discriminates whether the accumulation has been completed, by detecting the state of an input port INTEND of the microcomputer PRS. The sensor driving circuit SDR shifts the signal INTEND to the L-level state simultaneously with the start of charge accumulation, then monitors an AGC signal SAGC from the sensor SNS indicating the level of charge accumulation, and shifts the signal INTEND to the H-level state when said signal SAGC reaches a predetermined level. At the same time it shifts a charge transfer signal SH to the H-level state for a predetermined period, thereby transferring the charges of the photoelectric converting device to a CCD unit.

If the INTEND port in the step (106) is at the H-level state indicating the completion of accumulation or at the L-level state indicating the incomplete state thereof, the sequence proceeds respectively to a step (110) or (107).

The step (107) subtracts the time TI memorized in the step (105) from the value TIMER of said timer, and stores the result as a variable TE, which represents so-called accumulation time, or the period from the start of accumulation to the present. A next step (108) compares the variable TE with a constant MAXINT, and, if the former is smaller, the sequence returns to the step (106) to await the completion of accumulation. On the other hand, if the former is equal to or larger than the latter, the sequence proceeds to a step (109) to terminate the accumulation forcedly, by sending an accumulation end command from the microcomputer PRS to the circuit SDR, which, in response, shifts the charge transfer signal SH to the H-level state for a predetermined period, thereby transferring the charges from the photoelectric converting device to the CCD unit. Thus the charge accumulation of the sensor is completed in the flow up to the step (109).

The step (110) executes the A/D conversion of the signal AOS obtained, by amplification in the sensor driving circuit SDR, from the image signal OS of the sensor SNS, and stores the obtained digital signal into the RAM. More specifically, the driving circuit SDR generates the CCD driving clock signals $\phi_1$, $\phi_2$ in synchronization with the clock signal CK from the microcomputer PRS, whereby the CCD unit is driven by said signals $\phi_1$, $\phi_2$ and the charges therein are time-sequentially released as the output image signal OS. Said signal is amplified by an amplifier in the circuit SDR, and is supplied, as the signal AOS, to the analog input port of the microcomputer PRS. The microcomputer PRS executes the A/D conversion in synchronization with the clock signal CK thereof, and the obtained digital image signal is stored in succession in the predetermined address of the RAM.

Upon completion of the input of the image signals in this manner, a step (111) terminates the image signal input subroutine.

FIG. 7 is a flow chart of the lens driving subroutine.

When this subroutine is activated, a step (202) executes communication with the lens to receive two data S and PTH. The data S indicates the coefficient of the amount of defocus and the amount of movement of the focusing lens. In case of a single lens entirely moved for focusing, S=1 because the entire photographing lens constitutes the focusing lens. In case of a zoom lens, the value of S varies at different zoom positions. The data PTH represents the amount of movement of the focusing lens per output pulse of an encoder ENCF linked with the axial movement of the focusing lens LNS.

The lens driving amount FP, or the amount of movement of the focusing lens represented by the number of encoder output pulses, can be calculated from the amount of defocus DL and the above-mentioned data S, PTH according to the following equation:

$$FP = DL \times S / PTH$$

This calculation is conducted in a step (203).

A step (204) sends the data FP determined in the step (203) to the lens, thereby commanding the driving of the focusing lens (entire photographing lens in case it is moved for focusing).

A next step (205) executes communication with the lens to discriminate whether the lens driving of the amount FP commanded in the step (204) has been completed, and, if completed, a step (206) terminates the lens driving subroutine.

For detecting the completion of the lens driving, the lens driving amount FP is supplied to the control circuit LPRS, and the pulses SENCF of the encoder circuit ENCF are counted by a counter in the control circuit LPRS during the lens driving. Said circuit discriminates whether the count coincides with said value FP, and an output signal of the control circuit LPRS in case of coincidence is detected in the communication in said step (205).

Now reference is made to FIG. 1 for explaining the foreseeing operation subroutine, for calculating the lens driving amount in consideration of the release time lag. Steps (302) and (303) renew data for a new foreseeing calculation.

The step (302) enters the data of the memory $DF_2$ into $DF_1$. Prior to the execution of the subroutine this time, the memory $DF_2$ stores the last amount of defocus, which is transferred to the memory $DF_2$ which always stores the amount of defocus before last.

Also the content of a memory $DF_3$ is transferred to the memory $DF_2$ which always stores the last amount of defocus. Also the amount of defocus DEF detected this time is stored in the memory $DF_3$ which always stores the current amount of defocus.

The step (303) enters the data of a memory $DL_2$ into a memory $DL_1$ which always stores the lens driving amount before last. Also data DL is stored in the memory $DL_2$, which always stores the last lens driving amount.

In this manner the steps (303) and (304) store the amount of defocus and the lens driving amount of the current cycle and of the plural past cycles in the memories.

A step (304) calculates the time lag TL, by determining the sum of the data of memory area $TM_2$ and the release time lag TR. The memory area $TM_2$ stores the interval of the last focus state detecting operation and the current one as explained before, and the time lag is determined as $TL = TM_2 + TR$ on the assumption that the current interval is the same as the previous interval.

Steps (305) and (306) determine values A, B representing a and b in the equations (6) and (7), according to the data stored in the memories $DF_1$–$DF_3$, $DL_1$, $DL_2$, $TM_1$ and $TM_2$.

A next step (307) determines a compensation coefficient TF by a subroutine to be explained later.

A step (308) then calculates the value of the equation (9) according to the values of the memories and the results of the steps (304) to (306), and multiplies the result by the compensation coefficient TF to obtain the lens driving amount DL corresponding to the current image plane displacement. Then the subroutine is terminated in a step (309).

After the foreseeing operation is performed in this manner, the above-explained lens driving is conducted in the step (009), thereby moving the lens to a position coinciding with the image plane.

In the following there will be explained the compensation coefficient calculating subroutine.

Figure 8:
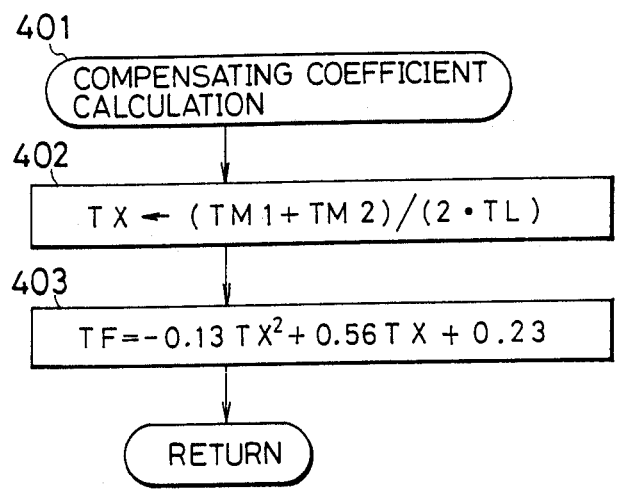
FIG. 8 is a flow chart showing a compensation coefficient calculating routine shown in FIG. 1.

FIG. 8 is a flow chart of said routine, in which a step (402) calculates the ratio of the intervals of focus state detecting operations to the time lag used in prediction, namely $TX = (TM_1 + TM_2)/(2 \cdot TL)$ from the data of the memory areas $TM_1$, $TM_2$ and the value TL determined in the step (304).

Then a step (403) calculates a coefficient TF for correcting the second-order term for the value TX determined in the step (402), and the subroutine is then terminated.

The present embodiment utilizes a fact that the interval of focus state detecting operations becomes shorter for a smaller value of TX for a constant release time lag, and is constructed in such a manner that the compensation coefficient TF becomes smaller ($0 < TF \leq 1$) when TX becomes smaller. Also as an excessively small value of TF for a large value of TX is detrimental, TF is designed to approach to 1 when TX is large.

As explained in the foregoing, the present invention reduces the error in lens driving based on the equation (9), as the step (308) corrects the coefficient of the second-order term for the lens driving according to the equation (9).

Figure 9:
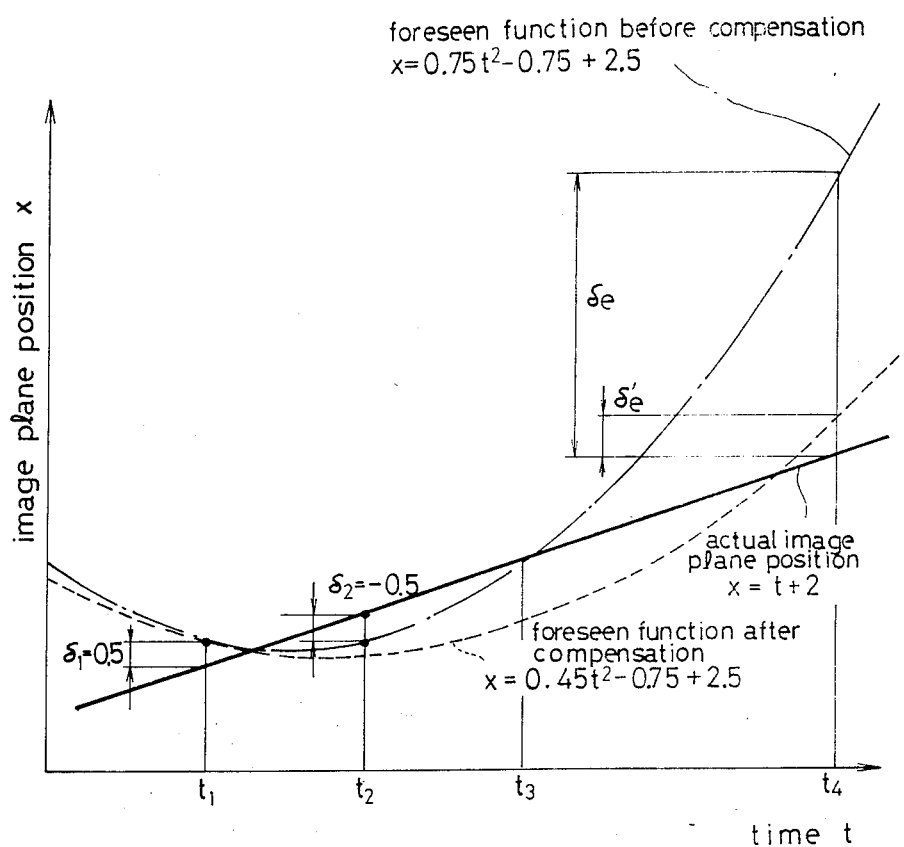
FIG. 9 is a chart showing the principle of lens driving in the automatic focusing device of the present invention.

FIG. 9 illustrates the actual effect of the present invention.

In FIG. 9, the solid line indicates the actual position of the image plane which is moving according to the movement of the object. In case errors $\delta_1$, $\delta_2$ are generated respectively at $t_1$ and $t_2$, the predicted function assumes a form indicated by a chain line, so that the error in prediction $\delta_e$ becomes about 11 times as large as $\delta_1$, $\delta_2$.

On the other hand the compensation of the second-order term by the multiplication with the compensation coefficient (0.6 in this case) shifts the foreseen function as indicated by a broken line, so that the error $\delta_e'$ in prediction is reduced to about ⅓ of the uncompensated error $\delta_e$.

Thus the error in prediction, resulting from the discrepancy between the image plane position recognized by the camera and the actual image plane position, caused by the errors in the focus state detecting system and in the lens driving system, can be significantly reduced by the compensation of the second-order term, which in fact represents a major portion of said error in prediction.

Since such compensation has the effect of bringing a non-linear function closer to a linear function, it is particularly effective in case the interval of the focus state detecting operations is small so that the movement of the image plane can be approximated to a linear function. On the other hand, if said interval is large so that the non-linear factor in the movement of the image plane is not negligible, there can be obtained a foreseeing function with an emphasized non-linear factor, by bringing the compensation coefficient close to 1. Such suitable selection of the compensation coefficient according to the situation secures a high following performance, while preventing the error in prediction.

In the foregoing embodiment, the compensation coefficient is represented as a function of the ratio TX of the interval of the focus state detecting operations to the time lag employed in foreseeing.

However the compensation coefficient in the present invention is not limited to a such function of TX but may be determined by other parameters for example so as to be close to 1 if said interval is so large that the non-linear (second-order) factor is negligible. It is also evidently possible to adopt a constant compensation coefficient instead of a coefficient determined by other parameters.

Figure 10:
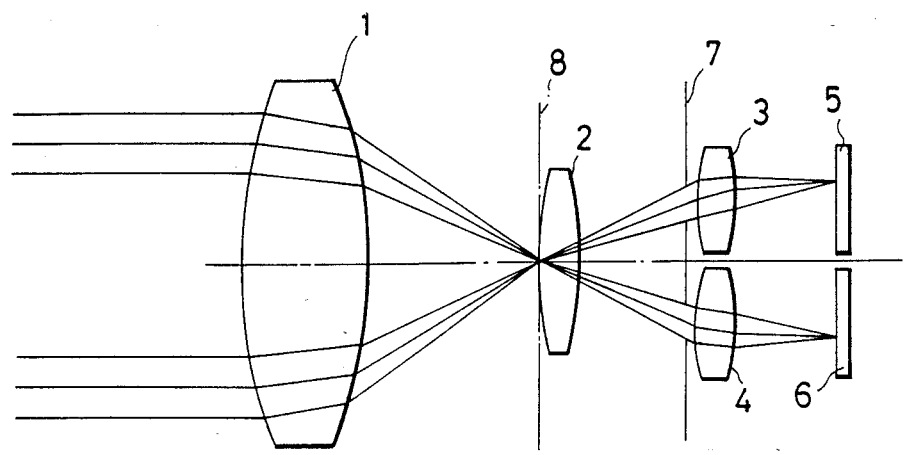
FIG. 10 is a schematic view of an optical system to be employed in the automatic focusing device of the present invention.

FIG. 10 is a schematic view of an optical system of a focus state detecting method to be employed in the foregoing embodiment and in other embodiments to be explained later. A field lens 2 is coaxially positioned with a photographing lens of which the focus state is to be detected. Behind said field lens, there are provided two secondary imaging lenses 3, 4 in positions symmetrical with respect to the optical axis. Sensor arrays 5, 6 are provided further behind. In the vicinity of the secondary imaging lenses 3, 4 there is provided a diaphragm 7. The field lens 2 focuses the exit pupil of the photographing lens 1 approximately on the pupil plane of the secondary imaging lenses 3, 4. Consequently, the light fluxes entering said lenses 3, 4 emerge from areas of a same size, which do not mutually overlap on the exit pupil plane of the photographing lens 1 and which respectively correspond to said secondary imaging lenses 3, 4. An aerial image formed in the vicinity of the field lens 2 is refocused by the secondary imaging lenses 3, 4 on the sensor arrays 5, 6, so that an axial displacement of said aerial image 8 causes displacements of two images on the sensor arrays 5, 6. It is therefore possible to detect the focus state of the photographing lens 1 by detecting the relative displacement of the images.

Said detection of image displacement can be achieved by a calculation of the correlation on the photoelectrically converted image signals of the two images formed on the sensor arrays 5, 6, and the method of said calculation is disclosed for example in the Japanese Laid-open Patents Nos. 58-142306, 59-107313 and 60-101513. The amount of image displacement thus determined is used for calculating the difference between the focal position of the photographing lens 1 and the film plane, or the amount of defocus.

Figure 11:
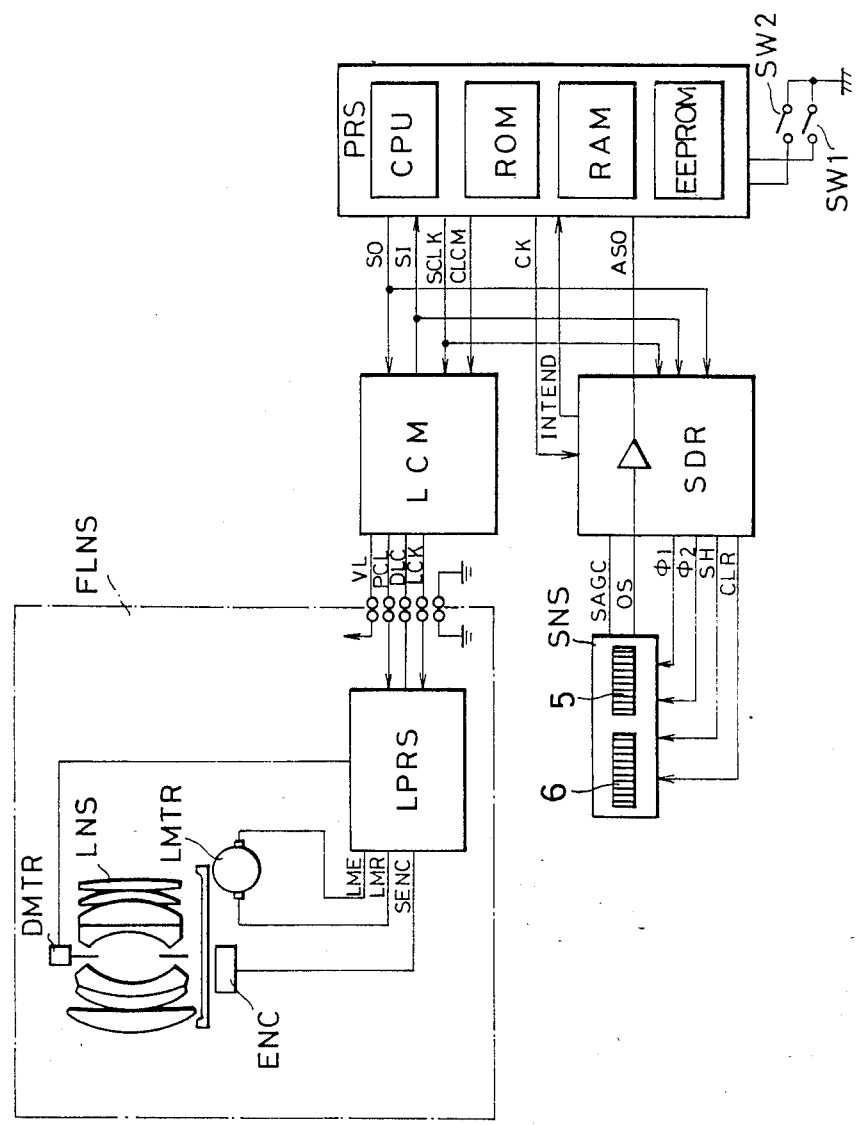
FIG. 11 is a block diagram of another embodiment of the camera equipped with the automatic focusing device of the present invention.

FIG. 11 is a block diagram of another embodiment of the present invention, employing the above-explained focus state detecting method.

A camera control circuit PRS, composed for example of a one-chip microcomputer equipped with a central processing unit (CPU), a ROM, a RAM, an A/D converter etc. controls various functions of the camera, such as automatic exposure control, automatic focus state detection, film advancement, film rewinding etc. according to sequence programs stored in the ROM. For this purpose the circuit PRS communicates with the circuits in the camera body and the lens FLNS and controls the functions thereof, by means of communications signals SO, SI and SCLK. SO is the data signal released from the control circuit PRS, S1 is the data signal entered into the control circuit PRS, and SCLK is a synchronization signal for said data signals SO, S1.

A lens communication circuit LCM supplies electric power VL to the lens when the camera is functioning, and serves as a communication buffer between the camera body and the lens when a high (H) level signal CLCM is entered from the control circuit PRS. When the control circuit PRS sends the H-level signal CLCM and a predetermined data signal SO in synchronization with the signal SCLK, the communication circuit LCM sends buffer signals LCK, DCL for said signals SCKL, SO to the lens FLNS through the contacts between the camera body and the lens. Simultaneously it sends a buffered signal of a signal DLC from the lens FLNS indicating the current position etc. thereof, as the data signal S1 to the control circuit PRS, in synchronization with said signal SCLK. A driving circuit SDR for a focus state detecting line sensors SNS, composed for example of the aforementioned sensor arrays 5, 6, is selected when a signal CSDR from the control circuit PRS is at the H-level state and is controlled by the signals SO, SCLK.

The signal CK is a clock signal for generating clock signals $\phi_1$, $\phi_2$ for driving the line sensors. A signal INTEND is used for informing microcomputer PRS of the completion of the charge accumulating operation. The output signal OS from the line sensors SNS are time-sequential image signals synchronized with the clock signals $\phi_1$, $\phi_2$, and, after amplification by amplifiers in the driving circuit SDR, are supplied as a signal AOS to the control circuit PRS. The control circuit PRS receives said signal AOS through an analog input port, effects A/D conversion internally in synchronization with the clock signal CK, and stores said signal in succession in the predetermiend addresses of the RAM. Similarly an output signal SAGC from an AGC control sensor (not shown) in the sensors SNS is supplied to the driving circuit SDR for the accumulation control of the line sensors SNS.

An in-lens control circuit LPRS receives, in synchronization with the buffer signal LCK, a signal DCL representing command data from the camera to the lens FLNS, and lens functions are determined in advance corresponding to said command data. Said control circuit LPRS analyzes said command data according to a predetermined procedure, and executes various operations such as focusing or diaphragm control or releases lens parameters (full-open F-number, focal length, coefficient of the amount of defocus to the amount of lens movement etc.) as an output signal DLC.

In the present embodiment there is employed an entirely moved single lens. Thus, when a focusing command is sent from the camera, a focusing motor LMTR is activated by signals LMF, LMR according to the amount and direction of drive simultanously commanded, to axially move the photographing lens LNS, thereby achieving the focusing operation. The amount of movement of the photographing lens LNS is monitored by counting pulse signals SENC of an encoder circuit ENC, and, when a predetermined movement is completed, the signals LMF, LMR are shifted to the L-level state, thereby controlling said focusing motor LMTR.

Also when a diaphragm control command is sent from the camera, a stepping motor DMTR for diaphragm control is activated according to the number of stop steps sent simultaneously. Since said stepping motor can be open controlled, the encoder for monitoring the function is not necessary.

Figure 12:
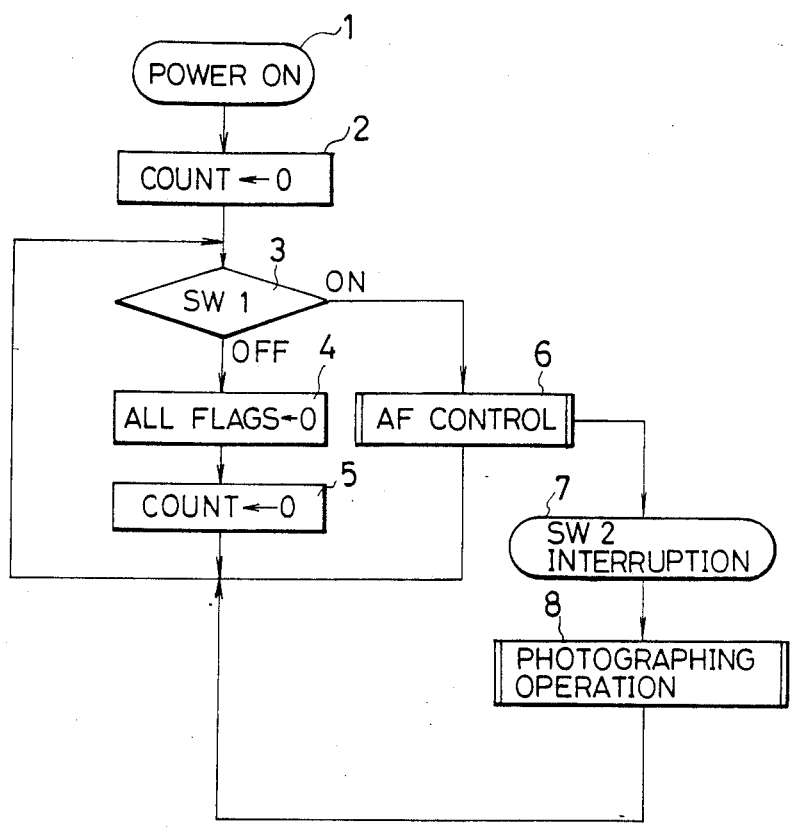
FIG. 12 is a flow chart showing the function of the automatic focusing device shown in FIG. 11.

In the following there will be explained the function of the camera described above, with reference to a flow chart shown in FIG. 12.

When an unrepresented power switch is turned on, the power supply is provided to the control circuit PRS, which thus starts the execution of a sequence program stored in the ROM.

At a first step 2, a counter COUNT for counting the number of auto focusing operations is set at "0". Then a step 3 discriminates the state of a switch SW1 to be closed by a first-stroke depression of the shutter release button, and, if said switch SW1 is off, the sequence proceeds to a step 4 for clearing all control flags set in the RAM, and then a step 5 sets the counter COUNT at "0".

Said steps 3 to 5 are repeated until the switch SW1 is closed or the power switch is turned off. When the switch SW1 is closed, the sequence proceeds to a step 6, which is an auto focusing subroutine for executing an AF control operation. In the course of said control operation, if a switch SW2 is closed by a second-stroke depression of the shutter release button, a shutter releasing operation is started by an interruption sequence to effect an exposure operation through the control of the diaphragm aperture and the shutter speed. Subsequently a shutter charging and a film advancement are conducted to complete the photographing operation for a frame of the film.

Figure 13:
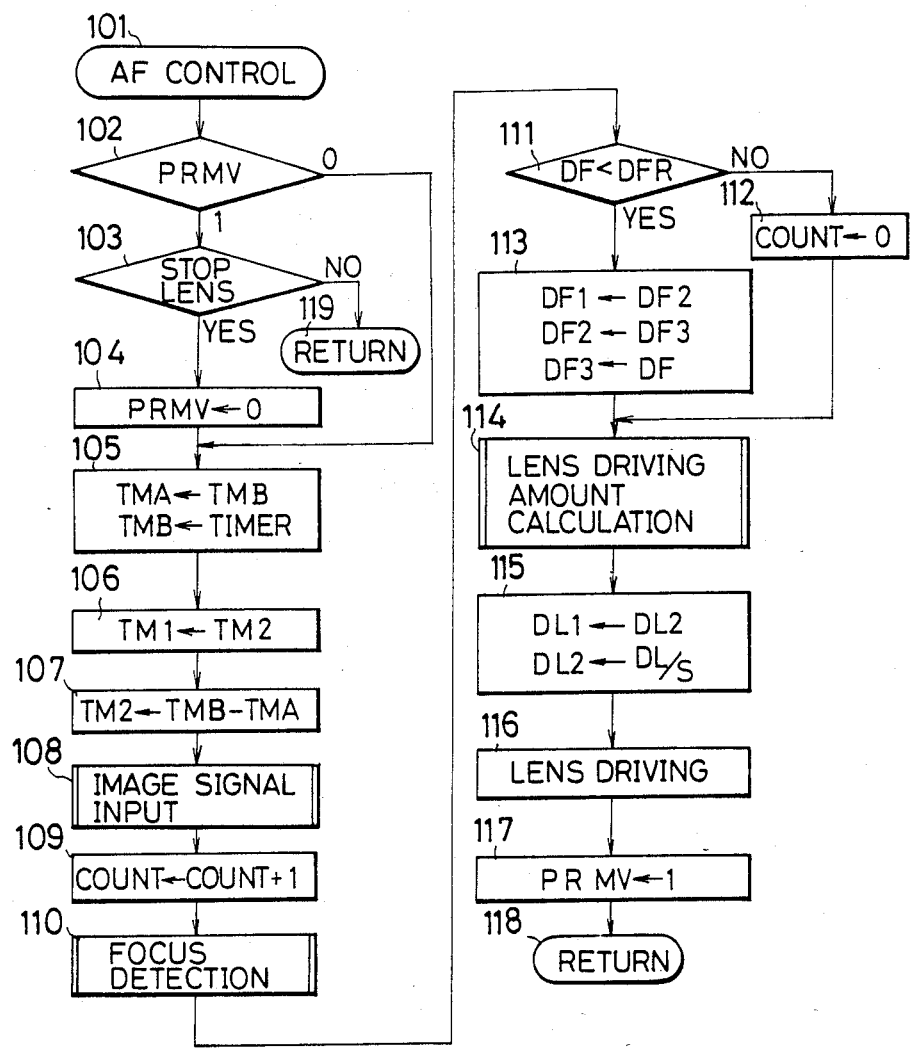
FIG. 13 is a flow chart showing an AF control subroutine shown in FIG. 12.

Now reference is made to FIG. 13 for explaining the auto focusing control subroutine executed in the aforementioned step 6.

A a step 102 discriminates the state of a flag PRMV for lens control to be explained later. As all the flags are cleared by the step 4 as explained before, said flag PRMV is also in the cleared state, so that the sequence proceeds to a step 105.

The step 105 enters the current time of an internal timer TIMER of the circuit PRS into a memory TMB, and enters the content of said memory TMB into a memory TMA. Thus the memory TMB stores the start time of the current AF operation, while the memory TMA stores the start time of the last AF operation, and the difference TMB−TMA of the contents of said memories indicates the interval from the last focusing operation.

A step 106 enters the content of a memory $TM_2$ into a memory $TM_1$. Then a step 107 executes subtraction of the contents of the memories TMB, TMA and enters the obtained result in the memory $TM_2$. Thus the memory $TM_2$ stores the interval from the last distance measuring operation to the current operation, while the memory $TM_1$ stores the interval from the distance measuring operation before last to the last distance measuring operation.

A next step 107 is an image signal input subroutine, for storing the A/D converted values of the image signal (AOS) obtained in the line sensors SNS, at predetermined addresses of the RAM. Then a step 109 increases the content, by one, of the counter COUNT for counting the number of distance measuring operations. Then a step 110 executes a focus state detecting subroutine, for detecting the focus state of the photographing lens LNS and calculating the amount of defocus from the image data stored in the RAM. A step 111 identifies that the main object has moved out of a distance measuring frame if the amount of defocus detected in said focus state detecting subroutine is larger than a certain value, and a step 112 resets the counter COUNT to "0", thereby restoring the initial state.

On the other hand, if the step 111 identifies that the moving object is still in the distance measuring frame, the sequence proceeds to a step 113 for storing the amount of defocus DF currently found in the step 110 into a memory $DF_3$. Also the contents of memories $DF_1$–$DF_3$ are renewed, which thus respectively store the amount of defocus in the cycle before last, that in the last cycle and that in the current cycle. A step 114 executes a lens drive amount calculating subroutine the details of which will be explained later. A step 115 then stores the lens driving amount DL, obtained in the step 114, in a memory $DL_2$. Also the content of the memory $DL_2$ is transferrred to a memory $DL_1$. Thus the memories $DL_1$ and $DL_2$ respectively store lens driving amounts of the last cycle and the current cycle. A next step 117 sets a flag PRMV, indicating the execution of lens driving, at "1", and a step 118 terminates the AF control subroutine.

When the AF control subroutine shown in FIG. 13 is called in the step 6, the step 102 discriminates the state of the flag PRMV as explained before. As the flag PRMV has been set at "1" if the lens has been driven in the preceding AF control subroutine, the sequence proceeds to a step 103 for communicating with the lens to detect the current driving state of the photographing lens LNS. Upon receipt of a signal from the lens FLNS indicating the completion of a driving operation commanded in the step 115, the sequence proceeds to a step 104 for resetting the flag PRMV to "0" and the sequence returns to the step 5. If a signal indicating that the lens driving is still in progress is given from the lens FLNS, the sequence proceeds to a step 119 to terminate the AF control subroutine. Consequently the AF control subroutine executes a focus state detecting operation and a lens control operation anew only when the photographing lens LNS is not driven.

Figure 14:
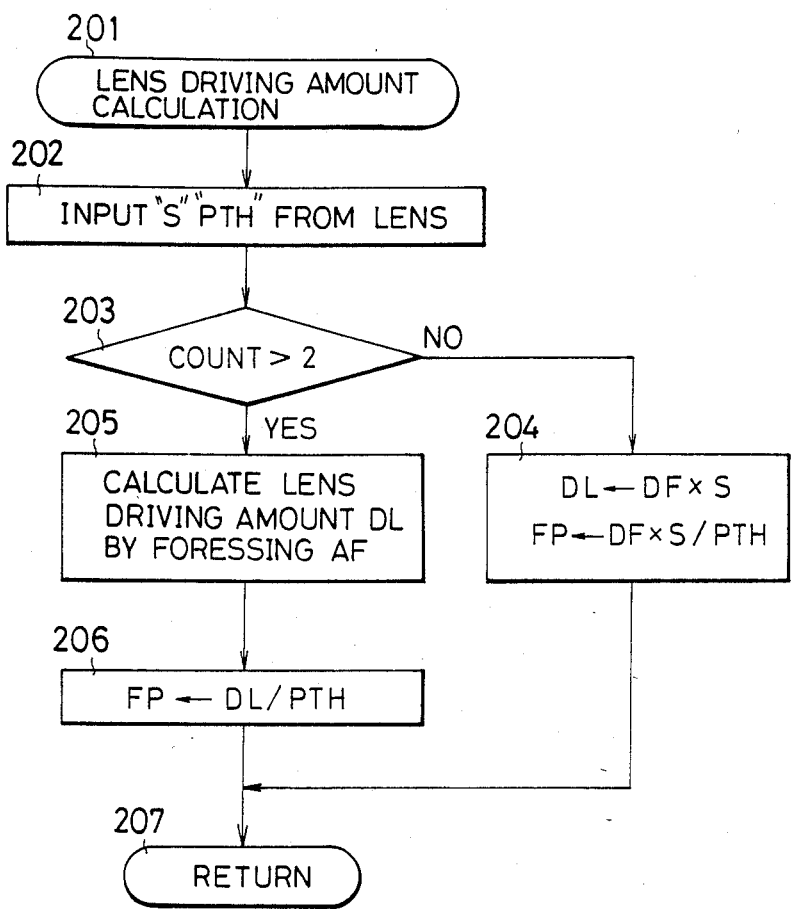
FIG. 14 is a flow chart showing a lens drive amount calculating subroutine shown in FIG. 13.

In the following there will be explained the lens drive amount calculating subroutine executed in the above-mentioned step 114, with reference to FIG. 14.

When this subroutine is called, a step 202 executes communication with the lens FLNS to receive two data S and PTH. The data S indicate the coefficient or ratio of the amount of defocus to the amount of movement of the focusing lens, specific to the photographing lens LNS. In case of a single lens entirely moved for focusing, as in the present embodiment, S=1 because the entire photographing lens constitutes the focusing lens. In case of a zoom lens, the value of S varies at different zoom positions. The data PTH represent the amount of movement of the focusing lens per output pulse of an encoder ENC linked with the movement of the focusing lens (photographing lens LNS in the present embodiment).

A step 203 identifies, from the content of the counter COUNT for counting the number of distance measuring operations, whether a focused position in a next photographing operation can be predicted, and, if such prediction is not possible, the sequence proceeds to a step 204 for calculating the lens driving amount FP, or the amount of movement of the focusing lens represented by the number of encoder output pulses, from the amount of defocus DL and the above-mentioned data S and PTH according to the following equation:

$$FP = DF \times S / PTH \tag{20}$$

Thus the lens drive amount calculating subroutine is terminated.

On the other hand, if the step 203 identifies that data necessary for foreseeing have been accumulated to enable foreseeing auto focusing (in the present embodiment, the foreseeing auto focusing is identified as possible if the data on two past distance measuring operations are accumulated), the sequence proceeds to a step 205. The details of said foreseeing auto focusing in the present embodiment will be explained later. The step 205 executes approximation of the relation between the image plane position and time to a second-order function.

More specifically the relation between the image plane position x and the time t is approximated by the following equation, and the coefficients a, b, c of said equation are determined from the amounts of defocus $DF_1$, $DF_2$, $DF_3$ in the current cycle and in the past two cycles, and the lens driving amounts $DL_1$, $DL_2$:

$$x = a \cdot a \cdot t^2 + bt + c \tag{21}$$

$$\alpha = 1 - d^{-(|DF3| + |DF2|)} \tag{21'}$$

$$a = \frac{TM_1(DL_2 - DF_2 + DF_3) - TM_2(DL_1 - DF_1 + DF_2)}{TM_1 \cdot TM_2 \cdot (TM_1 + TM_2)} \tag{22}$$

$$b = \frac{DL_2 - DF_2 + DF_3 + a \cdot TM_2^2}{TM_2} \tag{23}$$

$$c = DF_3 \tag{24}$$

wherein d is a constant.

Then the next lens driving amount DL is calculated by the following equation, from the coefficients α, a, b and c obtained from the equations (22) to (24):

$$DL = S(\alpha \cdot aTL^2 + bTL + DF_3) \tag{25}$$

wherein TL is the sum of the release time lag LETL and the AF time lag AFTL, namely:

$$TL = LETL + AFTL \tag{26}$$

The AF time lag AFTL is selected equal to $TM_2$, $TM_1$ or $(TM_1 + TM_2)/2$.

The data used in the equations (21) to (26) are taken from the memories $DL_1$, $DL_2$, $DF_1$-$DF_3$, $TM_1$ and $TM_2$.

A step 206 calculates the number of pulses PF of the encoder ENC, corresponding to the lens driving amount DL determined by the equation (25), as follows:

$$PF = DL/PTH \tag{27}$$

Thereafter the lens drive amount calculating subroutine is terminated.

Figure 15:
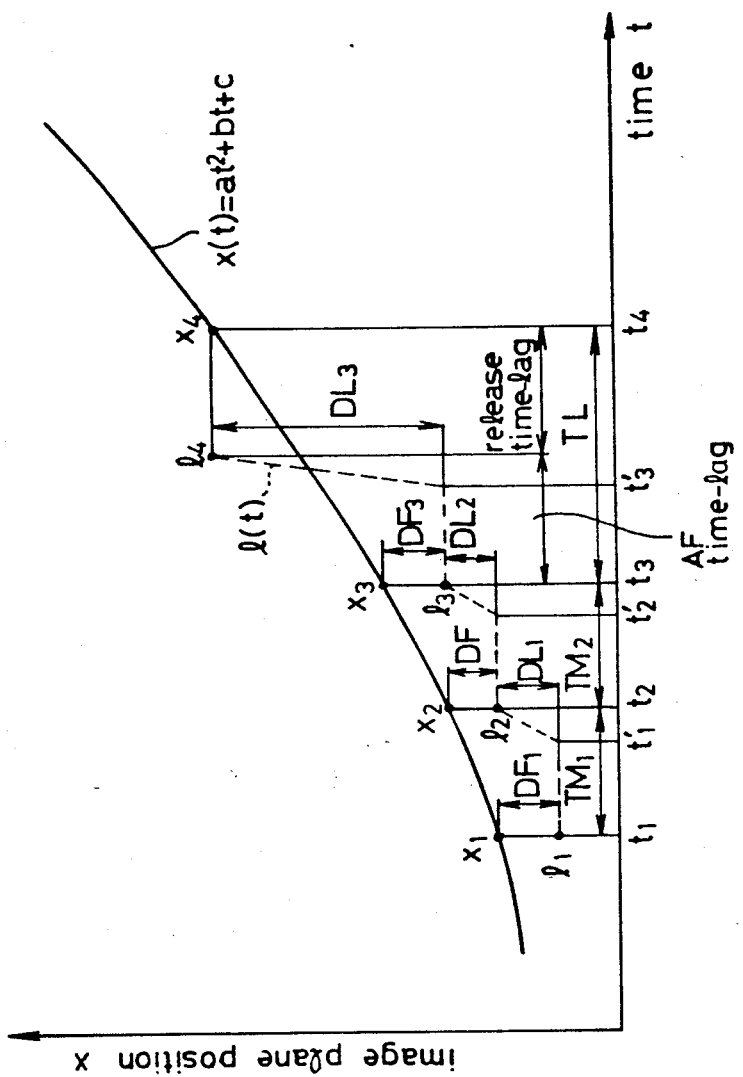
FIG. 15 is a chart showing the function of the automatic focusing device shown in FIG. 11.

Now reference is made to FIG. 15 for explaining the foreseeing auto focusing method of the present embodiment, utilizing the above-explained equation (25).

The amounts of defocus $DF_1$, $DF_2$, $DF_3$ at the times of past distance measuring cycles and at the time of current distance measuring cycle, and the corresponding lens driving amounts $DL_1$, $DL_2$ are utilized to determine the image plane positions $x_1$, $x_2$, $x_3$ at the times $t_1$, $t_2$, $t_3$. The current lens driving amount DL is converted into the amount of defocus DF, or on the basis of the image plane position.

By taking the image plane position of the lens at $t_3$ as the original point, there are obtained the following equations:

$$t_1 = -TM_2 - TM_1; \quad x_1 = -DL_2 - DL_1 - DF_1 \tag{28}$$

$$t_2 = -TM_2; \quad x_2 = -DL_2 + DF_2 \tag{29}$$

$$t_3 = 0; \quad x_3 = DF_3 \tag{30}$$

The relation between the image plane position x and the time t is approximated by a following second-order function:

$$x = at^2 + bt + c \tag{31}$$

By substituting the above-mentioned boundary conditions (28)–(30) in the equation (31), there are obtained:

$$DF_3 = c \tag{32}$$

$$-DL_2 + DF_2 = a \times (-TM_2)^2 + b \times (-TM_1) + c \tag{33}$$

$$-DL_2 - DL_1 DF_1 = a(-TM_2 - TM_1)^2 + b(-TM_2 - TM_1) + c \tag{34}$$

These equations (32)–(34) are utilized for determining a, b and c as follows:

$$a = \frac{TM_1(DL_2 - DF_2 + DF_3) - TM_2(DL_1 - DF_1 + DF_2)}{TM_1 \cdot TM_2 \cdot (TM_1 + TM_2)}$$

$$b = \frac{DL_2 - DF_2 + DF_3 + a \cdot TM_2^2}{TM_2} \tag{35}$$

-continued
$$c = DF_3 \tag{36}$$

The image plane position $x_4$ at a time $TL(=LETL+AFTL)$ after the time $t_3(=0)$ can be determined from the following equation:

$$x_4 = a \cdot TL^2 + b \cdot TL + c \tag{37}$$

Consequently the required amount DL of lens driving is represented as follows:

$$DL_3 = DL = x_4 - x_3 + DF_3 \tag{38}$$
$$= aTL^2 + bTL + DF_3$$

This is an equation for predicting the ideal movement of the image plane when the focus state detecting system or the lens driving system have no errors. In the actual camera, however, errors are often generated in the focus state detection and in the lens driving, thus leading to a mistaken prediction of the image plane position as explained before.

According to the present invention, following compensation is conducted in order to minimize such error in foreseeing.

In the foregoing equation (38) of foreseeing, the second-order term is most strongly influenced by errors in the focus state detection and in the lens driving, and is responsible for a large error in foreseeing. Thus the error in foreseeing can be reduce by applying a compensation to the coefficient of said second-order term.

In general, when the object is moving slowly or at a long distance so that the detected amount of defocus is small, the movement of the image plane is linear. The equation of foreseeing corresponding to such object is preferably a first-order function in order to reduce the error in prediction. Also even if the actual movement of the image plane is represented by a second-order function, the error resulting from the prediction with said first-order function is relatively small and negligible, because the original amount of defocus is small. On the other hand, in case the object is moved with a high velocity or is at a short distance so that the detected amount of defocus is large, the movement of the image plane generally takes place non-linearly, so that the corresponding equation of foreseeing should be a second-order function. Also, even if the actual movment of the image plane is linear, the lens is often driven to the vicinity of the shortest focusable distance where the image plane position varies rapidly, by the time of next distance measuring operation, since the movment of the object is fast. Consequently there is required a second-order equation of foreseeing for reducing the error in prediction.

An equation of foreseeing satisfying these conditions can be obtained by adding, to the second-order term in the equation (31), a compensating term which varies continuously or stepwise so as to assume a value "1" or "0" respectively when the detected amount of defocus is large or zero. An example of such compensating term is a represented by (21'):

$$x = \alpha a t^2 + bt + c \tag{21}$$

$$\alpha = 1 - d^{-(|DF_3| + |DF_2|)} \tag{21'}$$

The term $\alpha$ approaches to "0" or "1" respectively if the detected defocus $|DF_3| + |DF_2|$ is small or large. The term d is a constant which can be selected in a range of 10–50 in case of a single-lens reflex camera.

FIG. 16 is a chart showing the relation between $|DF_3| + |DF_2|$ and $\alpha$ in case $d=30$.

Figure 17B:
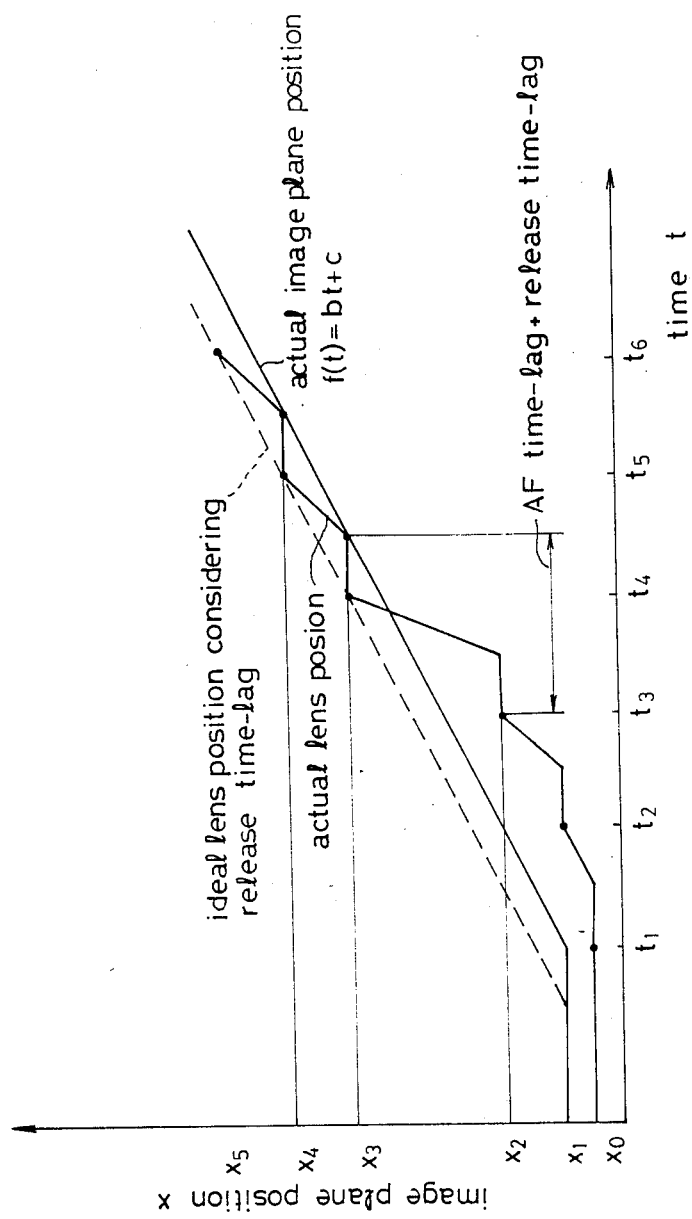

FIG. 17(a) shows the movement of the photographing lens LNS in case the relation of the image plane position x and the time t is assumed to be approximated by a second-order function, while FIG. 17(b) shows the movement of the photographing lens LNS in case said relation is assumed to be approximated by a first-order function.

According to the predicting method for the image plane movment of the present invention represented by the equation (21), the function shown in FIGS. 17(a) and in FIG. 17(b) are continuously switched according to the magnitude of $|DF_3| + |DF_2|$, thus always realizing a state of reduced error in prediction. Consequently there is provided a camera equipped with an automatic focusing device, capable of driving the photographing lens LNS to an ideal position in consideration of the delays in the following motion cause by the auto focusing time lag or the shutter releasing time lag, with stable movement of the photographing lens.

In the prediction in the step (205) of the present embodiment, the lens driving amount is determined by the equation (25) based on the equations (21), (21'), so that the functions shown in FIG. 17(a) and FIG. 17(b) are continuously switched. Thus there can be achieved preferable automatic focusing.

In the above-explained embodiment, $\alpha$ is determined by the equation (21'), but it is also possible to adopt:

$$\alpha = 1 - d^{-(|DF_3| + |DF_2| + |DF_1|)} \text{ or}$$

$$\alpha = 1 - d^{-|DF_3|}$$

Also there may be employed, as the equation (21):

$$x = \alpha a t^2 + \beta t + c$$

$$\alpha = 1 - d^{-(|DF_3| + |DF_2|)}$$

$$\beta = 1 - e^{-(|DF_3| + |DF_2|)}$$

wherein e is a constant.

Also in the foregoing embodiments, $\alpha$ is handled as a function of defocus as shown in (21'), but it may also be handled as a function of the lens driving amount as shown in the following equation (21''):

$$\alpha = 1 - d^{-|DL_2|} \tag{21''}$$

Figure 18:
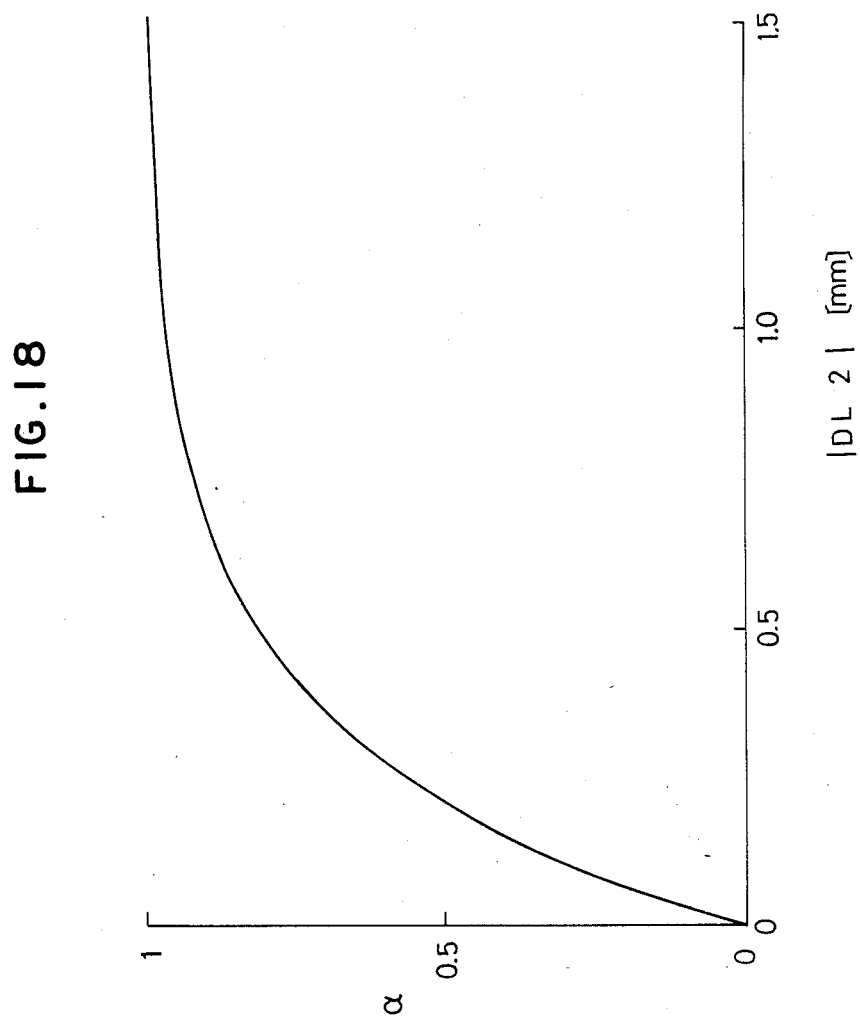
FIG. 18 is a chart showing the relation between a coefficient $\alpha$ and the lens drive amount.

FIG. 18 shows the relation between $|DL_2|$ and $\alpha$ based on said equation (21'') in case of $d=30$.

Also when $\alpha$ is represented as a function of the lens driving amount as in (21''), there can be obtained advantages the same as when $\alpha$ is a function of defocus.

Also as a modification of the function of the lens driving amount defining $\alpha$, there may be employed an equation:

$$\alpha = 1 - d^{-(|DL_2| + |DL|)}$$

or equations:

$$\alpha = 1 - d^{-|DL_2|} \text{ and}$$

$$\beta = 1 - e^{-|DL_2|}$$

wherein e is a constant.

We claim:

1. An automatic focusing device for driving a lens according to the output of a focus state detecting circuit, comprising:
   (a) an operation circuit for determining the amount of lens driving for focusing to an object position after a predetermined time, utilizing a plural-order function and based on past plural focusing data in past plural focusing operations conducted by the focusing device;
   (b) a driving circuit for driving the lens by the amount of lens driving determined by said operation circuit; and
   (c) a compensation circuit for correcting a high-order coefficient of said plural-order function.

2. An automatic focusing device according to claim 1, wherein said operation circuit is adapted to determine the coefficients to said plural-order function according to the focusing data of past plural focusing operations.

3. An automatic focusing device according to claim 2, wherein said operation circuit is adapted to determine the image plane position to the object after a predetermined time based on said plural-order function, and to determine the amount of lens driving required for causing the image plane position of the lens to coincide with said image plane position of the object.

4. An automatic focusing device according to claim 1, wherein said focusing data comprise the amount of defocus detected by the focus state detecting circuit.

5. An automatic focusing device according to claim 1, wherein said compensation circuit is adapted to correct the coefficient of the highest order in said plural-order function.

6. An automatic focusing device for driving a lens according to the output of a focus state detecting circuit, comprising:
   (a) an operation circuit for determining the amount of lens driving for focusing to an object position after a predetermined time, utilizing a plural-order function and based on past plural focusing data in past plural focusing operations conducted by the focusing device;
   (b) a driving circuit for driving the lens by the amount of lens driving determined by said operation circuit; and
   (c) a compensation circuit for correcting a high-order coefficient of said plural-order function according to said focusing data.

7. An automatic focusing device according to claim 6, wherein said compensation circuit is adapted to correct said high-order coefficient, according to the amount of defocus determined by the focus state detecting circuit.

8. An automatic focusing device according to claim 6, wherein said compensation circuit is adapted to correct said high-order coefficient according to the amount of past lens driving.

9. An automatic focusing device according to claim 8, wherein said amount of lens driving is determined by said operation circuit.

10. An automatic focusing device according to claim 6, wherein said operation circuit is adapted to determine the coefficients of said plural-order function according to the focusing data of past plural focusing operations.

11. An automatic focusing device according to claim 10, wherein said operation circuit is adapted to determine the image plane position of the object after a predetermined time based on said plural-order function, and to determine the amount of lens driving required for causing the image plane position of the lens to coincide with said image plane position of the object.

12. An automatic focusing device according to claim 6, wherein said compensation circuit is adapted to correct the coefficient of the highest order in said plural-order function.

13. An automatic focusing device according to claim 7, wherein said operation circuit is adapted to determine the coefficients of said plural-order function according to the focusing data of past plural focusing operations.

14. An automatic focusing device according to claim 13, wherein said operation circuit is adapted to determine the image plane position of the object after a predetermined time based on said plural-order function, and to determine the amount of lens driving required for causing the image plane position of the lens to coincide with said image plane position of the object.

15. An automatic focusing device according to claim 7, wherein said focusing data comprise the amount of defocus detected by the focus state detecting circuit.

16. An automatic focusing device according to claim 8, wherein said operation circuit is adapted to determine the coefficients of said plural-order function according to the focusing data of past plural focusing operations.

17. An automatic focusing device according to claim 16, wherein said operation circuit is adapted to determine the image plane position of the object after a predetermined time based on said plural-order function, and to determine the amount of lens driving required for causing the image plane position of the lens to coincide with said image plane position of the object.

18. An automatic focusing device according to claim 8, wherein said focusing data comprise the amount of defocus detected by the focus state detecting citcuit.

* * * * *

UNITED STATES PATENT AND TRADEMARK OFFICE
CERTIFICATE OF CORRECTION

PATENT NO. : 4,908,645
DATED : March 13, 1990
INVENTOR(S) : Masaki Higashihara, et al.

It is certified that error appears in the above-identified patent and that said Letters Patent is hereby corrected as shown below:

On the title page, Attorney, Agent, or Firm section,

"Fitzpatrick, Cella, Harper et al." should read
--Fitzpatrick, Cella, Harper & Scinto, et al.--.

COLUMN 3:

Line 16, "1" should be deleted and italics should be deleted.

Line 17, italics should be deleted.

Line 27, "$\delta_3 = x_3 - x_3 = \delta f_3 + \delta l_1 + \delta l_2$" should read
--$\delta_3 = x_3' - x_3 = \delta f_3 + \delta l_1 + \delta l_2$--.

UNITED STATES PATENT AND TRADEMARK OFFICE
CERTIFICATE OF CORRECTION

PATENT NO. : 4,908,645  Page 2 of 2
DATED : March 13, 1990
INVENTOR(S) : Masaki Higashihara, et al.

It is certified that error appears in the above-identified patent and that said Letters Patent is hereby corrected as shown below:

COLUMN 7:

Line 61, "step (107)" should read --step (017)--.

COLUMN 11:

Line 52, "is negligible." should read --is not negligible.--.

COLUMN 12:

Line 47, "SCKL," should read --SCLK,--.

COLUMN 14:

Line 24, "step 107" should read --step 108--.

Signed and Sealed this

Sixteenth Day of October, 1990

Attest:

HARRY F. MANBECK, JR.

*Attesting Officer*    *Commissioner of Patents and Trademarks*